United States Patent Office 3,468,842
Patented Sept. 23, 1969

---

3,468,842
POLYETHER POLYURETHANES STABILIZED WITH PHENOTHIAZINE DERIVATIVES
Joseph Charles Mollica, Bound Brook, and Ajaib Singh, Highland Park, N.J., assignors to American Cyanamid Company, Stamford, Conn., a corporation of Maine
No Drawing. Filed May 26, 1967, Ser. No. 641,446
Int. Cl. C08g *51/60*
U.S. Cl. 260—45.8       5 Claims

ABSTRACT OF THE DISCLOSURE

This invention relates to a polyether-based polyurethane stabilized against thermal degradation by the presence of a stabilizer of the formula:

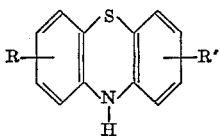

wherein R is either alkyl of 1–18 carbon atoms, alkoxy of 1–18 carbon atoms, halogen or alkylmercapto of 1–18 carbon atoms, and R′ is hydrogen or any one of the substitutents given in the definition of R.

---

This invention relates to the heat stabilization of polyether-based polyurethanes. More particularly, it relates to the stabilization of polyether-based polyurethanes by the incorporation therein of a compound represented by the Formula (I):

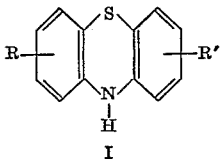

wherein R is either alkyl of 1–18 carbons, alkoxy of 1–18 carbons, halogen or alkylmercapto of 1–18 carbons and R′ is hydrogen or any one of the substituents given in the definition of R. It relates further to the polyurethane compositions thus stabilized.

Polyurethanes based on polyesters and polyethers have been commercially important in recent years, both in plastic and elastomer usage, as a result of their excellent properties over a wide range of temperatures. However, polyurethane elastomers exhibit poor heat conductivity. In most dynamic mechanical uses, temperatures in excess of 100° C. are usually observed. For example, blowouts have frequently been observed in fork lift truck tire applications, due to severe heat buildup. This is one of the major causes of failure of such tires made from polyurethane elastomers and this failure is the result of thermal degradation. Therefore, there is a need for a means whereby polyurethane elastomers can be effectively stabilized against the deteriorative effects of temperature in order to realize their potential in high temperature and dynamic mechanical uses.

It is an object of this invention to provide a method whereby polyether-based polyurethanes can be effectively stabilized against the deteriorative effects of heat. It is a further object of this invention to provide polyether-based polyurethane compositions having improved thermal stability.

The present invention is based on the discovery that polyether-based polyurethane elastomers are effectively stabilized against the deteriorative effects of thermally induced degradation by the incorporation therein of a phenothiazine compound represented by Formula I.

The polyurethane elastomers stabilized by this invention provide excellent mechanical properties for the uses intended. They are able to withstand high temperature environment and dynamic mechanical uses where high internal temperature is generated because of external or internal friction. These deficiencies, notably thermal breakdown or degradation, resulting in excessive loss of mechanical properties, are avoided. Thermal degradation has been shown to be a more serious problem in polyether-based polyurethanes than in polyester-based polyurethanes, i.e., they degrade at a lower temperature and at a faster rate than polyester-based polyurethanes.

The beneficial results of the present invention are surprising in that the phenothiazine compounds are specific to polyether-based polyurethanes. It is further surprising since not all phenothiazines are effective. Thus, it has been found that substitution on the phenothiazine nitrogen atom actually promotes thermal degradation of these elastomers. It is only when the phenothiazine compound conforms to the structure shown that significant stabilization is achieved.

The method of incorporation is not critical. The stabilizer may be added to the prepolymer prior to chain extension; or swelled into the fully extended elastomer at a later time; or it may be milled into polyurethane gum stocks before they are vulcanized. However, for practical reasons, the former method is preferred. The concentration of stabilizer used will depend on the particular phenothiazine. A generally useful concentration will be from about 0.05 part to about 5.0 parts, based on the weight of the polymer. Among the phenothiazines useful as thermal stabilizers according to the present invention are included for example 3,7-dimethylphenothiazine, 2,8-dimethylphenothiazine, 3,7-diethylphenothiazine, 3,7-dibutylphenothiazine, 3,7-dioctylphenothiazine, 2,8-dioctylphenothiazine, 3,7-dibutoxyphenothiazine, 3,7-dioctyloxyphenothiazine, 3-thiomethylphenothiazine, 4-thiomethylphenothiazine, 4-chlorophenothiazine, 2-chlorophenothiazine, 2-fluorophenothiazine, 7-phenylphenothiazine, 2-methoxyphenothiazine, and the like.

The polyether-based polyurethane elastomers which are stabilized against thermal degradation according to the present invention are prepared by conventional chain extension of an isocyanate-terminated prepolymer with a polyol, such as 1,4-butanediol, 1,6-hexanediamine, MOCA [methylene bis(o-chloroaniline)], and the like. As used in the polyurethane art, and in this specification as well, the term "prepolymer" is intended to mean the low molecular weight reaction product of a polyol, such as a polyether, with a molar excess of an organic diisocyanate. The prepolymer is isocyanate-terminated as a result of the use of said molar excess.

Among the polyether polyols useful in the present invention are those represented by the following formula:

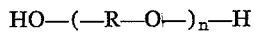

HO—(—R—O—)$_n$—H wherein R is an alkylene radical and $n$ is an integer sufficiently large that the polyol has a molecular weight of at least 500. Molecular weights of from 500 to about 5000 are useful, but those in the range of from about 600 to about 3000 are preferred. Polyether glycols representative of those which are useful include polyethylene ether glycol, poly-1,2-propylene ether glycol, tetramethylene ether glycol, poly-1,2-dimethylene ether glycol, polydecamethylene ether glycol, and the like.

Among the organic diisocyanates which may be usefully employed in the preparation of the prepolymers, including aliphatic, cycloaliphatic, and aromatic diisocyanates and combinations thereof, are 2,4-toluenediisocyanate, 2,6-toluenediisocyanate, including the various isomeric mixtures thereof, m-phenylene diisocyanate, 4,4′-biphenylenediisocyanate, 1,5-naphthalenediisocyanate, 4,4'-methylene bis(phenylisocyanate), 1,4-tetramethylene diisocyanate, 1,6-hexamethylene diisocyanate, 1,4-cyclohexylene diisocyanate, 4,4'-methylene bis(cyclohexyl isocyanate), and the like. The preferred diisocyanates are those aromatic diisocyanates in which the isocyanate group is attached directly to the aromatic ring, such as the various toluene-diisocyanates.

Stress-relaxation measurements of elastomers require a cross-linked, network structure. Thus, the prepolymers used in these experiments were chain-extended with the triol, trimethylol propane. Stress-relaxation studies have been commonly used to measure thermal stability of polymers, and the technique is one of the most sensitive available for this purpose. The samples herein were tested on a six-channel, autographic stress-relaxometer. This instrument consists of load sensing elements, a means for extending and maintaining the specimens at a constant elongation, and a circulating air oven. The oven temperature was maintained at a temperature of 150° C.±0.1° C. and the samples extended to 5±.05%. The decrease in the modulus with time, which is due to thermal degradation, was recorded automatically by the instrument. Data relating to the relative thermal stability are obtained from plots of $f(t)/f(O)$ versus log time, or log $f(t)/f(O)$ versus time, where $f(t)$ and $f(O)$ are the forces at time $t$ and $t=O$, respectively, required to maintain the sample at a given extension. The data are reported as $T_{90}$ and $T_{36.8}$ and represent the times at T° C. that are required for a sample to degrade to a value equal to 90% and 36.8% of the initial stresses. This is a measure of the amount of degradation experienced by the specimen. The rate of stress-decay observed thru stress-relaxation measurements can be directly related to the rate of chemical chain scission reactions responsible for the degradation of the specimens.

The invention is more fully illustrated by the example which follows.

Example 1

To 1.0 mole of polytetramethylene ether glycol at 50° C. was added dropwise 3.0 moles of 2,4-toluene diisocyanate. When all the diisocyanate was added, the reaction was allowed to continue overnight at 50° C. The prepolymer thus formed was then extracted in a liquid-liquid extractor at 50° C. using n-hexane. When analysis of the prepolymer showed the essential absence of free, un-unreacted 2,4-toluene diisocyanate the extraction was stopped and the hexane in the prepolymer flashed off in vacuo at 50° C. The propolymer, which had an NCO content of 3.45%, was then chain extended with trimethylolpropane at 100% of the NCO equivalent of the prepolymer and molded at 100° C. into a pad 6" x 6" x 0.75 mil. The specimens, T–50 strips, were cut from this pad.

When evaluating the various stabilizers, shown in the accompanying table, the compounds were incorporated into the elastomer in either one of two ways: (1) by swelling into the fully cured elastomer, or (2) by adding the stabilizer to the prepolymer prior to chain extending with the trimethylolpropane. The latter method is the preferable and more conventional way. Swelling of the stabilizer into the elastomer is accomplished by swelling the specimen in a tetrahydrofuran solution containing the stabilizer. The concentration of the solution was adjusted to insure the incorporation of 1% (based on the weight of the specimen) of the stabilizer after deswelling.

TABLE.—PHENOTHIAZINES AS STABILIZERS [1] FOR POLYETHER-BASED POLYURETHANES

| Phenothiazine derivative | $T_{36.8}$ at 150° C. (min.) | $T_{90}$ at 150° C. (min.) | Relative stabilization $\frac{T_{36.8} \text{ Treated}}{T_{36.8} \text{ Control}}$ |
|---|---|---|---|
| Control (no additive) | 106 | 8 | |
| 3,7-dioctyloxy-10-methoxymethyl | 48 | 4 | 0.45 |
| 10-steroyl- | 54 | 5 | 0.51 |
| 2-trifluoromethyl | 94 | 7 | 0.89 |
| Unsubstituted | 130 | 7 | 1.20 |
| 5-hydroxy-12H-benzo-[α] | 310 | 15 | 2.90 |
| 2-chloro | 410 | 15 | 3.90 |
| 4-thiomethyl | 445 | 17 | 4.20 |
| 2-methoxy | 465 | 18 | 4.40 |
| 4-chloro | 470 | 15 | 4.40 |
| 3,7-dioctyl | 700 | 25 | 6.60 |
| Do | [2] 860 | 27 | 8.10 |

[1] All additives added at 1% level to the polytetramethylene ether glycol—TDI prepolymer before curing it with an equivalent of trimethylolpropane.
[2] The additive was incorporated by swelling to network in 1% THF solution and then deswelling.

We claim:
1. A polyether-based polyurethane stabilized against thermal degradation by the presence of an effective amount of a stabilizer of the formula:

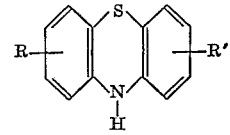

wherein R is either alkyl of 1–18 carbon atoms, alkoxy of 1–18 carbon atoms, halogen or alkylmercapto of 1–18 carbon atoms, and R' is hydrogen or any one of the substituents given in the definition of R.

2. The polyurethane of claim 1 wherein the compound is 3,7-dioctylphenothiazine.

3. The polyurethane of claim 1 wherein the compound is 4-chlorophenothiazine.

4. The polyurethane of claim 1 wherein the compound is 2-methoxyphenothiazine.

5. The polyurethane of claim 1 wherein the polymeric substrate is the reaction product of polytetramethylene ether glycol and 2,4-toluenediisocyanate.

References Cited

UNITED STATES PATENTS

| 2,605,249 | 7/1952 | Albert | 260—45.9 |
| 2,984,645 | 5/1961 | Hoeschele | 260—45.8 |
| 3,214,397 | 10/1965 | Cox | 260—2.5 |
| 3,351,608 | 11/1967 | Oertel et al. | 260—45.9 |
| 3,364,170 | 1/1968 | Savides | 260—45.8 |
| 3,379,675 | 4/1968 | Jensen et al. | 260—45.8 |

DONALD E. CZAJA, Primary Examiner

R. A. WHITE, Assistant Examiner

U.S. Cl. X.R.

260—77.5